(12) United States Patent
Hall (10) Patent No.: US 12,038,084 B2
(45) Date of Patent: Jul. 16, 2024

(54) PLANETARY GEAR PIN

(71) Applicant: Dana Heavy Vehicle Systems Group, LLC, Maumee, OH (US)

(72) Inventor: Justin Hall, Ottawa Lake, MI (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/045,410

(22) Filed: Oct. 10, 2022

(65) Prior Publication Data

US 2024/0117876 A1   Apr. 11, 2024

(51) Int. Cl.
*F16H 57/04* (2010.01)
*F16H 57/08* (2006.01)

(52) U.S. Cl.
CPC ........... *F16H 57/08* (2013.01); *F16H 57/043* (2013.01); *F16H 57/0434* (2013.01); *F16H 57/0471* (2013.01); *F16H 57/0486* (2013.01); *F16H 57/0482* (2013.01); *F16H 2057/085* (2013.01)

(58) Field of Classification Search
CPC .... F16H 57/08; F16H 57/043; F16H 57/0471; F16H 57/0486; F16H 2057/085; F16H 57/0482; F16H 57/0479
See application file for complete search history.

(56) References Cited

U.S. PATENT DOCUMENTS

| 9,404,568 B2 * | 8/2016 | Feraud | F16H 57/0479 |
| 9,982,771 B2 * | 5/2018 | Muldoon | F16H 1/28 |
| 11,041,562 B2 * | 6/2021 | Lemoine | F16H 57/043 |
| 11,047,467 B2 * | 6/2021 | Matsuoka | F16H 1/28 |
| 11,105,396 B2 * | 8/2021 | Goumas | F16H 57/0479 |
| 2006/0068961 A1 | 3/2006 | Haka | |

FOREIGN PATENT DOCUMENTS

| DE | 10325781 A1 | 1/2005 | |
| DE | 102004046472 A1 | 4/2006 | |
| DE | 102012223234 A1 | 6/2014 | |
| DE | 102014115227 A1 | 5/2015 | |
| DE | 102017120883 A1 * | 10/2018 | |
| EP | 3599397 A1 * | 1/2020 | F02C 7/36 |
| EP | 3726097 A1 * | 10/2020 | F02C 7/06 |
| EP | 3879135 A2 * | 9/2021 | B60K 1/00 |
| JP | 58196368 A * | 11/1983 | |
| JP | 2005273670 A | 10/2005 | |
| JP | 2010169237 A | 8/2010 | |
| JP | 2013133854 A | 7/2013 | |
| WO | 2016101425 A1 | 6/2016 | |

* cited by examiner

*Primary Examiner* — Sherry L Estremsky (74) *Attorney, Agent, or Firm* — McCoy Russell LLP (57) ABSTRACT

A planetary transmission system is disclosed. In an example, the system may include a planet gear, an outer bearing, and a planetary gear pin including an inner bore fluidly coupled to an outer bore, wherein the outer bore is narrower in diameter than the inner bore and a difference in diameter therebetween allows oil flow by gravity from the inner bore to the outer bore and reduces oil from flow from the inner bore to the outer bore, wherein oil exits the inner bore via a plurality of holes fluidly coupling the inner bore to the outer bearing without valves.

13 Claims, 5 Drawing Sheets

PLANETARY GEAR PIN

TECHNICAL FIELD

The present description relates generally to a pin of a gear. The pin may be designed to receive and direct lubrication fluid to the gear and/or a bearing supporting a gear.

BACKGROUND AND SUMMARY

Vehicles may include a drive train with a transmission. The transmission may include a plurality of gearsets with a plurality of gears. Splash lubrication methods may be used to direct lubricating fluid and lubricate planet gears. The shafts as well as teeth of the gears may be lubricated with lubricating fluid to reduce friction and remove heat during operations. Planetary gear pins may be used with the gears, and may be hollow and include holes to allow lubricating fluid to flow through a bore into and out of holes to the exterior of the gear pin. Lubricating fluid emerging from holes in a planetary gear pin may lubricate bearings and the gear circumferentially surrounding the planetary gear pin.

A planetary gearset may include a fixed planet carrier or fixed carrier planetary system for applications such as providing a centrifugal pumping action. Therein, the planet carrier may not be able to rotate to generate centripetal force, where splash lubrication may not be available. Without centripetal force, fluid sprayed or splashed onto the center of a planetary gear pin may not be retained in the bore of the pin, and instead flow out the entry.

The inventors herein have recognized these and other issues with such systems. As developed in one example is a planetary transmission system comprising: a planet gear; an outer bearing; and a planetary gear pin including an inner bore fluidly coupled to an outer bore. The outer bore is narrower in diameter than the inner bore. The difference in diameter between the inner bore and outer bore allows oil flow by gravity from the outer bore to the inner bore and reduces lubricant flow from the inner bore to the outer bore. Lubricant may exit the inner bore without valves via a plurality of holes fluidly coupling the inner bore to the outer bearing.

In this way by having outer bore that is narrower in diameter than the inner bore, it is possible to improve lubrication because of the increase in fluid leaving via the plurality of holes. The difference in diameter between the outer bore and inner bore creates a sump where fluid accumulates. Lubricant in the sump is more resistant to flow in the direction of the outer bore due to the difference in diameter. Additionally, fluid in the sump is less resistant to flow as the one or more of the plurality of holes opens to the lowest point on the pin with respect to the direction of gravity. The above features also allow the pin to accept and direct lubricant continuously without centripetal force. The increase of and increased constancy in lubricant flow through the plurality of holes may improve lubrication and heat dissipation during operations using a fixed or stationary planet carrier.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The description relates to a pin used to mount a bearing and planet gear to a planet carrier, referred to herein as a planet pin. The planet pin may support and direct lubricant to the bearing and planet gear. The planet pin may be drilled, with the drilling comprised of a first and a second bore of different diameters. However, it is to be appreciated that the formation of the first and second bore may be non-limiting. Lubricant may enter the planet pin through a mouth to the first bore and exit through a plurality of holes are fluidly coupled to the second bore.

Lubricant or other fluid may enter the pin through a mouth. The difference in diameter between the first and second bore creates a step that may prevent lubricant or other fluid from flowing back toward the mouth. The step may also form a sump. The step and sump allows the pin to retain lubricant, or lubricating fluid, without centripetal force. The pin may therein be used to provide consistent flow of lubricant to the planet gears for when a planet carrier is fixed or stationary.

Figure 1:
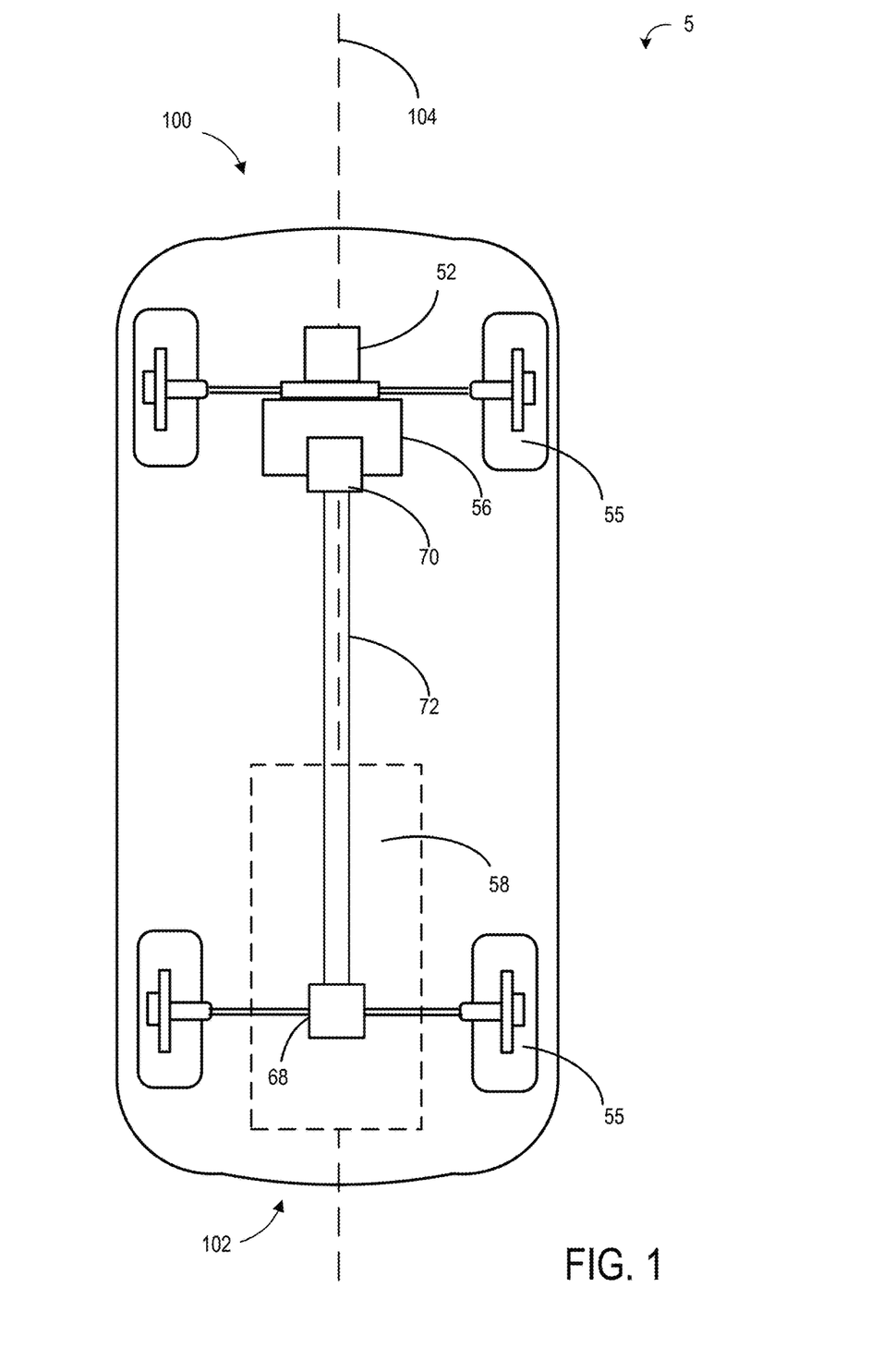
FIG. 1 shows an example schematic of a vehicle which may include a gear box and transmission housing a stationary planet carrier.
Figure 2:
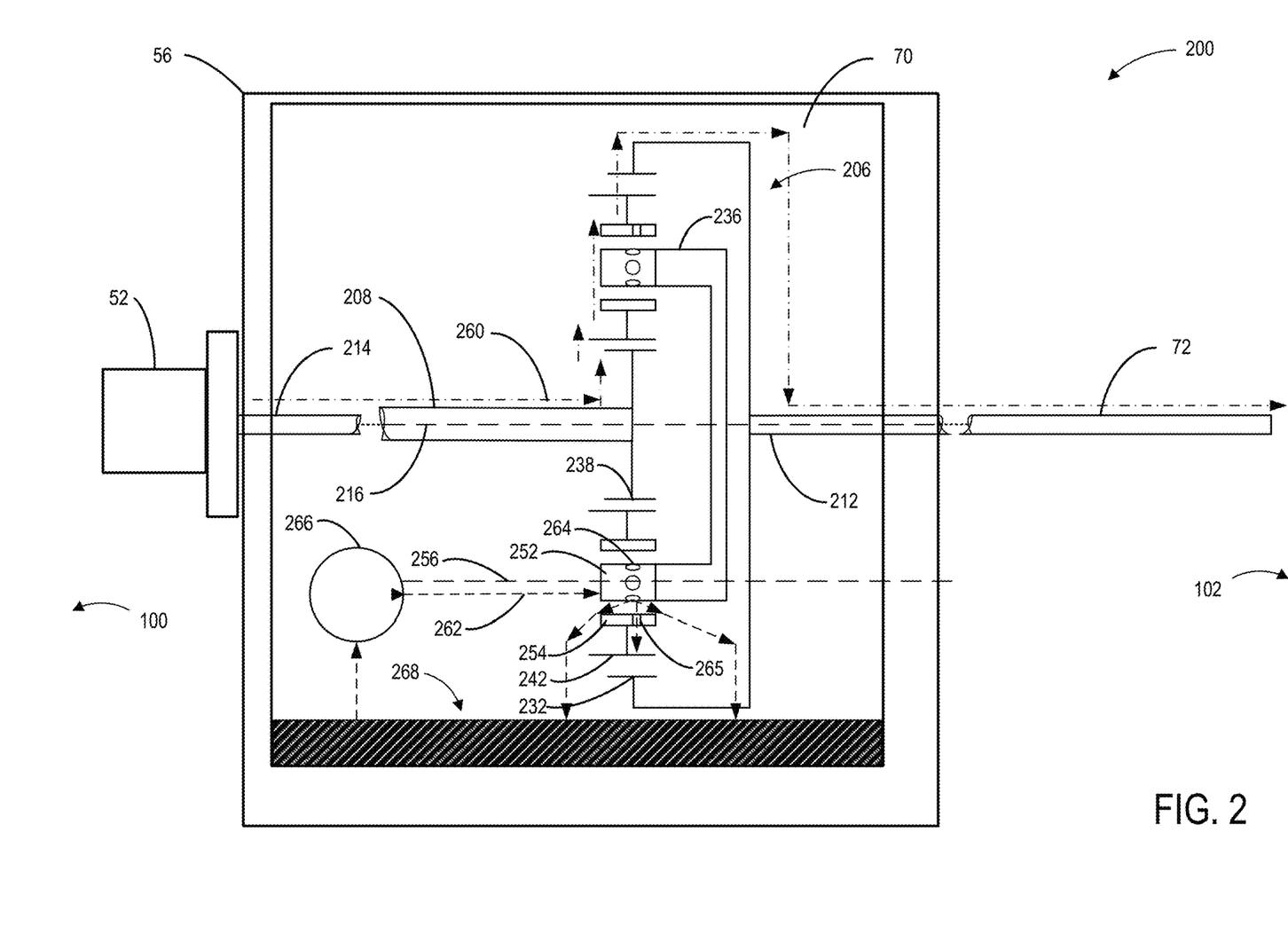
FIG. 2 shows an example schematic of the components of the stationary planet carrier and a gear pin within the gearbox and transmission.
Figure 3A:
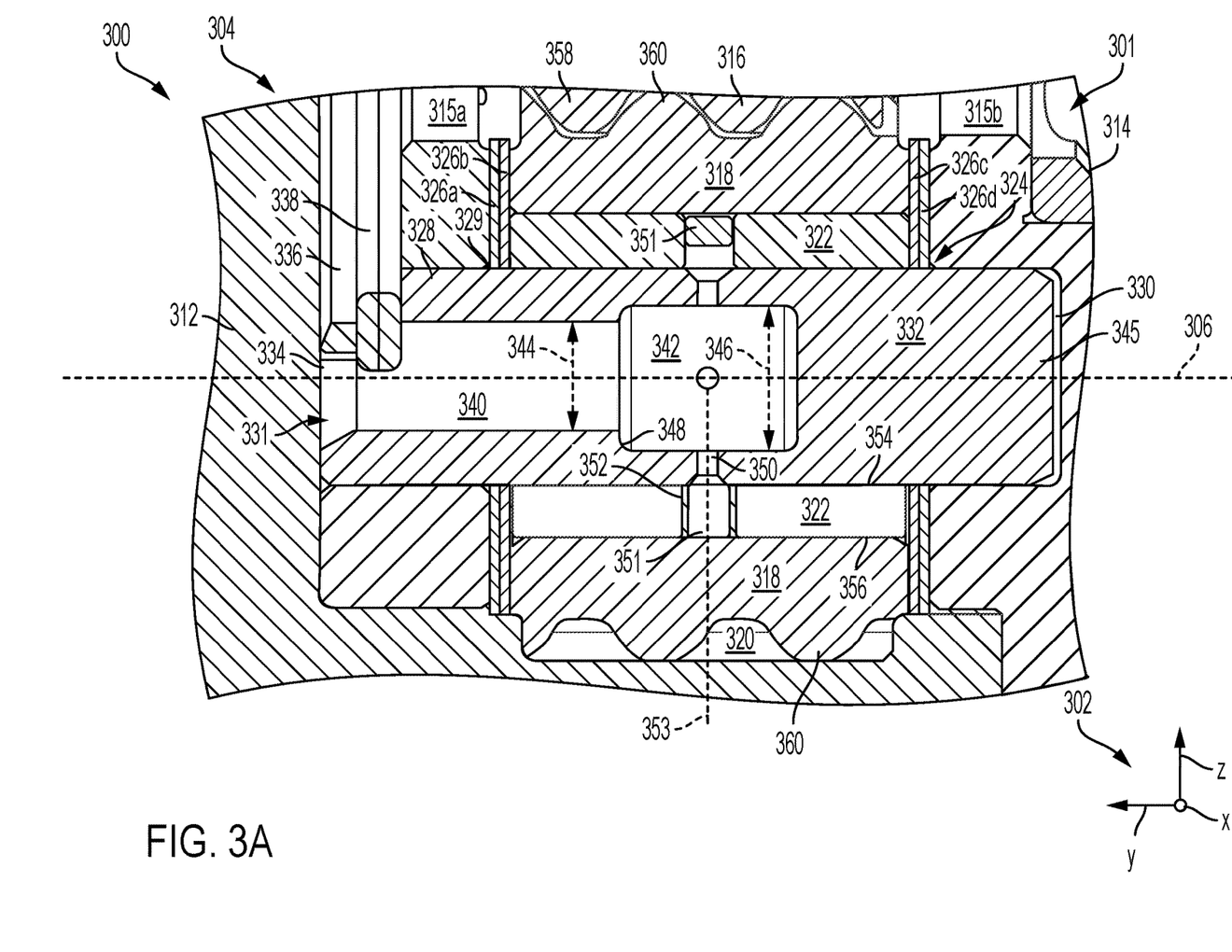
FIG. 3A shows cross-section view of the planetary gear pin assembled with the stationary planet carrier and other components of FIG. 2 in more detail.
Figure 4:
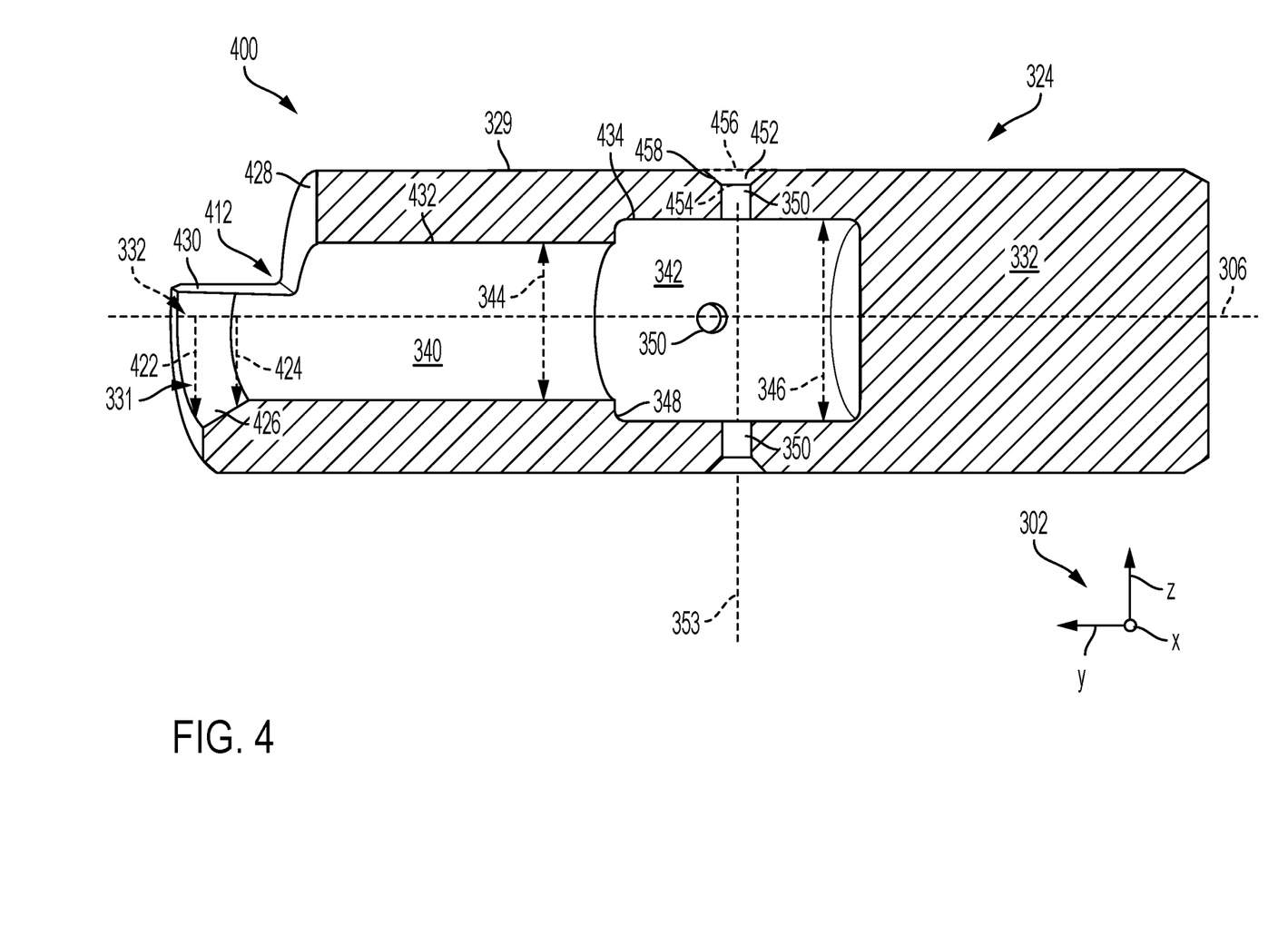
FIG. 4 shows a side cross-section view of the planetary gear pin isolated from the gear assembly.

A schematic of a vehicle is shown with a transmission that may contain an example gear box of the present disclosure as well as components, such as the wheels, the gear box may affect in FIG. 1. A schematic of a gearset with a fixed planet carrier and planetary gear pins within transmission and a gear box of the present disclosure are shown in FIG. 2. FIG. 2 also shows a schematic of the components that the gears of the gearset may be affected by or may affect directly or indirectly. FIG. 3A shows a side view of a cross-section of a planetary gear pin and assembled planet carrier of the present disclosure that may be part of the gearset of FIG. 2. FIG. 3A shows a side view of a cross-section of a planetary gear pin and assembled planet carrier of the present disclosure with lubricant being sprayed onto and flowing through the planetary gear pin. A side view of an isolated planetary gear pin taken on a cross-section is shown in FIG. 4.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

Figure 3B:
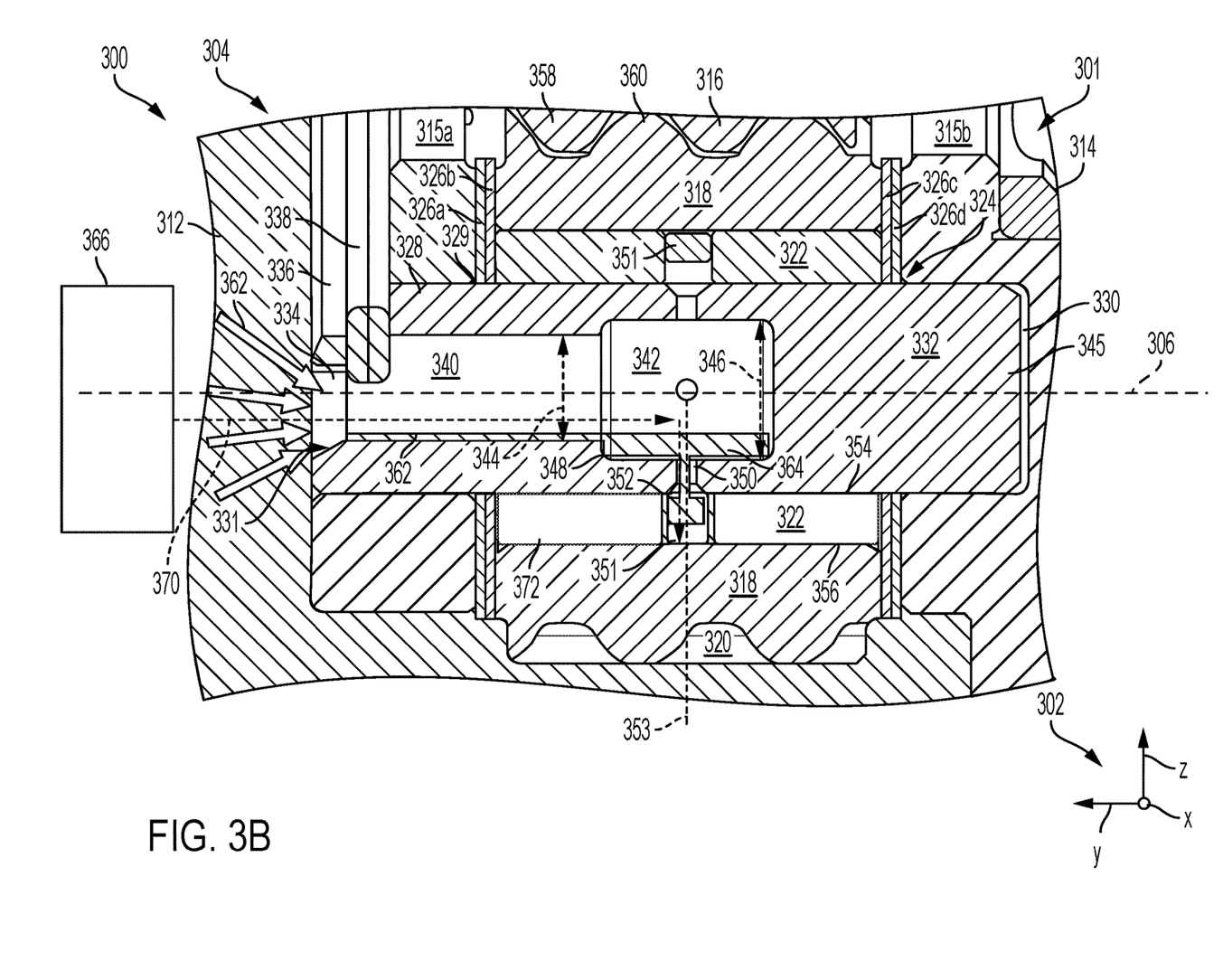
FIG. 3B shows the cross-section view of FIG. 3A a path of lubricant flow through the planetary gear pin.

FIGS. 1-2 show schematics of example configurations with relative positioning of the various components. Herein, when the vehicle is positioned on level ground, vertical is shown with respect to gravity. FIGS. 3A-4 are shown approximately to scale. However, it is to be appreciated that other relative dimensions may be used, if desired. As used herein, the terms "approximately" is construed to mean plus or minus five percent of the range unless otherwise specified.

Further, FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Turning to FIG. 1, an example vehicle 5 is shown. The vehicle 5 may have a front end 100 and a rear end 102, and may be bisected into two approximately symmetrical halves by a longitudinal axis 104.

In some examples, vehicle 5 may be a hybrid vehicle with multiple sources of torque available to one or more vehicle wheels 55. Alternatively, the vehicle 5 may include solely an internal combustion engine. In other examples, vehicle 5 may be an all-electric vehicle, powered exclusively by an energy storage device such as a battery 58.

In the example shown, vehicle 5 includes a prime mover 52. In one example the prime mover 52 may be an engine, such as an internal combustion engine. For this example, the prime mover 52 may receive a fuel such as gasoline or diesel to combust, converting chemical energy from the fuel into rotational energy.

In other examples the prime mover 52 may be an electric machine which may be an electric motor, an electric motor/generator, or an electric motor/engine. The prime mover 52 may receive electrical power from the battery 58 which is converted to rotational energy, e.g., torque, at a transmission 56. The transmission 56 may be a planetary transmission with a gearset with at least one sun gear surrounded by and meshed with a plurality of planet gears. The torque may be delivered to vehicle wheels 55, which includes a set of front wheels proximate to a front end 100 of vehicle 5 and a set of rear wheels proximate to a rear end 102 of vehicle 5. Prime mover 52 may also be operated as a generator to provide electrical power to charge the battery 58, for example, during a braking operation.

FIG. 1 shows an embodiment prime mover 52 provides rotational energy to the wheels of vehicle 5 via the transmission 56. For this example, the embodiment of vehicle 5 has a prime mover 52 and the transmission 56 closest to the front end 100 of vehicle 5. A gear box 70 is incorporated into the transmission providing the transmission with different gears to select via a clutch. For this example, the prime mover 52 and transmission 56 may provide rotational energy to a drive shaft 72 to transfer rotational energy to a differential 68 to rotate the wheels 55 closest to the rear end 102. It will be appreciated that in other examples, rotational energy may be alternatively provided to the wheels 55 located near the front end 100 of vehicle 5. Furthermore, in other examples, each of the wheels 55 near the front end 100 and the wheels 55 near the rear end 102 may be coupled to individual transmissions, such as when vehicle 5 is configured with all-wheel drive. As well, in other embodiments, transmission 56 and/or prime mover 52 may be arranged closer to the rear end 102 of vehicle 5 rather than the front end 100.

The battery 58 may be between the vehicle wheels 55 and closer to the rear end 102 of vehicle 5 than the front end 100. For example, the battery 58 may be positioned below rear passenger seats of the vehicle. In another example, the battery 58 may be located in a floor of a rear compartment of the vehicle or may be integrated into a vehicle chassis. In other examples, however, the battery 58 may be located in a different relative position within vehicle 5 than shown in FIG. 1.

Turning to FIG. 2 a schematic 200 of the transmission 56 and gear box 70 are shown containing a gearset 206. The gearset 206 may circumferentially surround and drivingly coupled a sun shaft 208. For this example, the sun shaft 208 and gearset 206 may drivingly couple a first shaft. The gearset 206 may have an output shaft 212 coupled to a second shaft. In schematic 200, the transmission 56 is a planetary transmission, with a the gearset 206. Shafts coupled to gearset 206, such as the sun shaft 208, are part of a planetary transmission system. The gearset 206 therein may act as a planetary gearset. For one example the first shaft may be an output shaft 214 of the prime mover 52 and the second shaft may be the drive shaft 72. The output shaft 214 may be referred to herein as the prime mover output shaft 214.

It is to be appreciated that the first shaft may not be the output shaft 214 of the prime mover 52. In another example, the first shaft may be coupled to a gear of an output shaft of a prime mover. In another example, the first shaft may be an output shaft of a first gear. For this example, the first gear may be drivingly coupled to another gear or a plurality of gears. Further, the other gear or plurality of gears may be part of another gearset drivingly coupled to a shaft, such as the output shaft 214 of the prime mover 52.

Additionally, the second shaft may not be the drive shaft 72. In another example, the second shaft may be another shaft besides the drive shaft 72. For this example, the other shaft may be drivingly coupled to a gear of a drive shaft 72. In another example, the second shaft may be the input to a gear. For this example, the gear may be drivingly coupled to another gear or a plurality of gears. Further, the other gear or plurality of gears may be part of a gearset coupled to a shaft, such as drive shaft 72.

The sun shaft 208 may be centered on a first central axis 216, wherein the sun shaft 208 may circumferentially surround and have lengths collinear with the first central axis 216. Features described as axial may be approximately parallel with an axis unless otherwise specified. Features described as lateral may be approximately perpendicular to an axis unless otherwise specified. The central axis 216 is longitudinal with respect to and therein may act as a longitudinal axis for the gearset 206, gear box 70, and transmission 56. With respect to a longitudinal axis, such as the central axis 216, features described as longitudinal may be approximately parallel to a longitudinal axis. Features that may circumferentially surround or extend from a longitudinal axis may be described as radial.

The gearset 206 may be formed by a ring gear 232, a planet carrier 236, a sun gear 238. The ring gear 232 circumferentially surrounds the planet carrier 236 and is drivingly coupled to the gears of the planet carrier 236 and the output shaft 212. The planet carrier 236 may circumferentially surround and be drivingly coupled to the sun gear 238. The planet carrier 236 is fixed and is stationary and therein unable to rotate or spin about the central axis 216. The sun gear 238 may be drivingly coupled to the sun shaft 208. The planet carrier 236 may house a plurality of planet gears 242 that circumferentially surround and are supported on bearings 254. The bearings 254 and pins 252 may each circumferentially surround a second central axis 256. The bearings 254 may circumferentially surround and be supported by pins 252. The pins 252 may act as planetary gear pins for the planet gears 242. The bearings 254 may act as outer bearings for the pins 252. The planet gears 242 may spin about the bearings 254 and pins 252, and each of the planet gears 242 may spin about a second central axis 256.

The sun gear 238 may be drivingly coupled to and have gear teeth meshed with a plurality of planet gears 242 of the planet carrier 236. The planet gears 242 may drivingly couple and intermesh with the ring gear 232.

An example of a powerflow 260 is shown by arrows. The powerflow 260 may be transferred mechanical energy in the form of torque from the prime mover output shaft 214 to the sun shaft 208. The torque from the prime mover output shaft 214 may cause the sun shaft 208 and sun gear 238 to spin about the central axis 216. The powerflow 260 may continue and transfer mechanical energy in the form of torque from the sun shaft 208 to the planet gears 242 via the spinning of sun gear 238. For this example, the planet carrier 236 may be locked preventing the planet carrier 236 spinning about the central axis 216. The spinning of the planet gears 242 may transfer mechanical energy into the ring gear 232. If the torque is great enough, the ring gear 232 may be forced to rotate and spin about the central axis 216. The rotation of the ring gear 232 may transfer mechanical energy into and force the output shaft 212 to rotate about the central axis 216. As mechanical energy is transferred between the gears, the speed of rotation, e.g., rotation per minute (RPM), may be slowed and the torque may increase. The powerflow 260 may end by transferring mechanical energy of an increased torque from the ring gear 232 and output shaft 212 into the drive shaft 72 or another second shaft.

A lubricant flow 262 is represented by arrows. The lubricant flow 262 illustrates the path a lubricant, such as oil, may take to lubricate the planet gears 242. When oil is used as a lubricant, the lubricant flow 262 may be referred to as an oil flow. To begin the lubricant flow 262, lubricant may be drawn from a sump 268 formed of the gear box 70 and/or transmission 56 via a pump 266. The pump 266 may spray or splash toward the pins 252. Lubricant sprayed by the pump 266 through the lubricant flow 262 may flow into the pins 252 in a longitudinal direction. Lubricant may flow out of the pins 252 through a plurality of first holes 264 to lubricate the bearings 254. Lubricant may then flow through the bearings 254 via a plurality of second holes 265 and around the bearings 254 to further lubricate the bearings 254 and the planet gears 242. After exiting the bearings 254 and planet gears 242, the lubricant flow 262 may end by returning lubricant to the sump 268.

A set of reference axes 302 are provided for comparison between views shown in FIG. 3A-4. The reference axes 302 indicate a y-axis, an x-axis, and a z-axis. In one example, the z-axis may be parallel with a direction of gravity and the x-y plane may be parallel with a horizontal plane that a gear assembly 301 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

Turning to FIG. 3A, it shows a side view 300 of a cross-section 304. The cross-section 304 shows a gear assembly 301 including a portion of a ring gear assembly 312 and a planet carrier 314. The gear assembly 301 may be part of a gearset the same similar to the gearset 206. The ring gear assembly 312 may hold a ring gear the same or similar to ring gear 232. The planet carrier 314 may be fixed and be the same or similar to planet carrier 236. A central axis 306 may divide the cross-section 304 into a top and bottom half with respect to the z-axis. The central axis 306 may be the same or similar to the second central axis 256 shown in FIG. 2. A central axis that is the same or similar to the first central axis 216 may be located above a planet gear 318 and concentric to a sun gear 316.

The sun gear 316, the planet gear 318, a bearing 322, and a pin 324 may be the same or similar to sun gear 238, the planet gears 242, the bearings 254, and the pins 252, respectively. The pin 324 may act as a planetary gear pin the same or similar to the pins 252. The planet gear 318 and bearing 322 are positioned around the central axis 306 and a pin 324. The bearing 322 may circumferentially surround the central axis 306 and pin 324, and the planet gear 318 may circumferentially surround the bearing 322. The bearing 322 may act as an outer bearing for the pin 324 to support the planet gear 318.

Above the central axis 306 is the sun gear 316 and much of a first body 315a and second body 315b of the planet carrier 314. The sun gear 316, the planet gear 318, and a bearing 322 may be located between the first body 315a and second body 315b, with respect to the central axis 306. For one example the first body 315a is positive to the sun gear 316, planet gear 318, and bearing 322, with respect to the y-axis. For this example, the second body 315b is negative to the sun gear 316, planet gear 318, and bearing 322, with respect to the y-axis. Below the central axis is a space 320 where a ring gear may be inserted and coupled to the ring gear assembly 312.

The first body 315a and second body 315b may hold the pin 324, the planet gear 318, and the bearing 322 in place. A plurality of rings that may be spaced between the planet gear 318 and bearing 322 and the planet carrier 314. The rings may act as retainer rings, and therein prevent the removal of the planet gear 318 and bearing 322 from the planet carrier 314 without deliberate force and/or the removal of the rings. The rings may include a first ring 326a, a second ring 326b, a third ring 326c, and a fourth ring 326d. For the example in FIG. 3A-3B, there may be a first ring 326a and a second ring 326b located between the first body 315a and the planet gear 318 and/or bearing 322. For this example, there may be a third ring 326c and a fourth ring 326d located between the second body 315b and the planet gear 318 and/or bearing 322.

Located between the ring gear assembly 312 and first body 315a with respect to the central axis are a ring 336 and a seal 338. The pin 324 may pass through a first body bore 328 in the first body 315a and be inserted into a cavity referred to as a second body bore 330 formed in the second body 315b. The first body bore 328 and second body bore 330 may be referred to herein as a first body bore 328 and a second body bore 330, respectively. The first and second body bores 328, 330 may support the pin 324. The first and second body bores 328, 330 may surround and contact an external surface 329 of the pin 324. There may be a plurality of body bores similar to first body bore 328 and second body bore 330 positioned at different locations in the planet carrier 314. The plurality of body bores may be positioned radially from the center of the planet carrier 314. When installed in the planet carrier 314, the body bores may be positioned radially from the sun gear 316.

The pin 324 may be formed of a material 332 surrounding a cavity 331. The pin may have a cylindrical shape with a smooth external surface 329. The material 332 may be a substance, such as a metal, that may be smooth and have the mechanical strength to support a planet gear 318 and bearing 322. As an example, the cavity 331 may be formed via drilling. However, it is to be appreciated that the method of formation of the cavity 331 from the material 332 of the pin 324 may be non-limiting, and other methods, such as casting, may be used. The cavity 331 may be formed of a mouth 334, a first bore 340, and a second bore 342.

The ring 336 and a seal 338 may be located above a mouth 334 and be inserted partially into a cut (e.g., cut 412 in FIG. 4) in the material 332 of the pin 324.

The mouth 334 may form into the first bore 340, and the first bore 340 may form into the second bore 342 in a center region of the pin 324 where structural rigidity may be below a lower threshold. The first bore 340 may act as an outer bore, wherein the first bore 340 is closer to the mouth 334 along the central axis 306 than the second bore 342. The second bore 342 may act as an inner bore, wherein the second bore 342 is further from the mouth 334 along the central axis 306 than the first bore 340. The first bore 340 may be of a first diameter 344 and the second bore 342 may be of a second diameter 346. The second diameter 346 is larger than the first diameter 344, therein forming a step 348 where the first bore 340 and second bore 342 meet. The step 348 and difference between the first and second diameters 344, 346 allows and may encourage lubricant flow via gravity from the first bore 340 to the second bore 342. The pin 324 may have an end 345. The end 345 may act as one end that is solid without any lubricant exit or entry points. The end 345 may be circular in shape. The end 345 of the pin 324 is opposite to the mouth 334 and first bore 340 along the central axis 306. The end 345 may be referred to as an opposite end relative to the first bore 340.

Surrounding the second bore 342 are a plurality of first holes 350 which may be referred to herein as first lubrication holes 350. The first holes 350 may fluidly couple the first bore 340 and second bore 342 to the bearing 322 without a valve or plurality of valves. The first holes 350 may extend radially from one bore in the pin 324, such as the second bore 342, and through the material 332 to the external surface 329. For the example in the present disclosure, the first holes 350 may extend radially from the second bore 342 and through the material 332 to the external surface 329 in pin 324. The holes 350 may be the only direct connection between the external surface of the pin and the inner bore. The first holes 350 are arranged in a number and at an angle such that one or more holes is present at approximately the lowest point on the pin 324 and/or similar pins no matter which body bores the pin 324 and/or similar pins are installed into. At least one hole is present at the lowest point on the pin 324 and/or similar pins no matter how the pin 324 and/or similar pins are turned in the first and second body bores 328, 330 or similar body bores. Additionally, in the center of the bearing 322 are a plurality of second holes 352. The second holes 352 may be the same or similar to the second holes 265. The second holes 352 may extend radially from an inner surface 354 to an outer surface 356 of each of the bearings 322. The second holes 352 may align with the first holes 350 along an axes 353 extending radially from the central axis 306. A spacer 351 may be positioned in and enclosed by each of the second holes 352. The spacer 351 may separate the bearing 322 from the external surface 329 allowing fluid, such as lubricant, to pass through.

Returning to the sun gear 316 and planet gear 318, the sun gear 316 and planet gear 318 may be intermeshed and mechanically coupled via a plurality of sun gear teeth 358 and planet gear teeth 360, respectively. Additionally, the planet gear 318 and a ring gear may be intermeshed and mechanically coupled via the plurality of planet gear teeth 360 and a plurality of ring gear teeth, respectively.

Turning to FIG. 3B, it shows the cross-section 304 where the pin 324 is being sprayed with lubricant 362. The lubricant 362 may follow a path 370 represented by arrows into and through the pin 324. Lubricant 362 may be sprayed from an orifice 366 fluidly coupled to or formed from a sprayer toward the mouth 334 of the pin 324 as indicated by arrows. The lubricant 362 may enter and travel on a path parallel with the central axis 306 from the mouth 334 into the first bore 340 and from the first bore 340 into the second bore 342. For the example in FIG. 3B, the fluid may flow in a negative direction along the central axis 306 with respect to the y-axis. The step 348 may be shaped to form a sump 364 where lubricant 362 may accumulate in the second bore 342. The step 348 may reduce and/or prevent the flow of lubricant from the second bore 342 and sump 364 from moving back into the first bore 340 and the direction of the mouth 334. The step 348 and difference therebetween the first and second diameters 344, 346 may allow for the pin 324 to hold lubricant without centripetal force as the pin is stationary during operation/rotation of the rotatable transmission components. The accumulation of lubricant in the sump 364 may allow for more lubricant 362 to lubricate the bearing 322 and planet gear 318 the per spray or splash from the 366 orifice. The accumulation of lubricant 362 in the sump 364 may also provide consistent fluid flow of lubricant 362 during times of intermittent spray or splashing of lubricant 362. The lubrication of the bearing 322 and planet gear 318 may therein be improved when the planet carrier 314 is fixed or stationary.

The lubricant 362 in the sump 364 may be guided by gravity to drain through at least one of the first holes 350. Lubricant 362 exits the second bore 342 through the first holes 350. Lubricant 362 that flows from the first holes 350 may lubricate the external surface 329 and bearings 322. The lubricant 362 may exit the bearings 322 through at least one of the second holes 352. Upon leaving the second hole 352, lubricant may lubricate outer surface 356 and an inner surface 372 of the planet gear 318. The lubricant may travel between the second ring 326b and bearing 322 to prevent friction. The lubricant may travel between the third ring 326c and bearing 322 to prevent friction. The lubricant may travel between the second ring 326b and planet gear 318 to prevent friction. The lubricant may travel between the third ring 326c and planet gear 318 to prevent friction. Lubricant exiting the spaces between the second and third rings 326b, 326c and planet gear 318 may lubricate the planet gear teeth 360.

Turning to FIG. 4, it shows a side view 400 of the pin 324 isolated from the ring gear assembly 312, planet carrier 314, and other features of the cross-section 304. Above the mouth 334 of the pin 324 may be a cut 412. The cut 412 may be semi cylindrical and cut into the top half of the pin 324 above the central axis 306. For one example, the cut 412 intersects with the mouth 334 and partially intersects with the first bore 340. For this example, the cut 412 does not intersect with the second bore 342. The ring 336 and seal 338 may be inserted into the cut 412 above the mouth 334. The cut 412 and mouth 334 may form the first bore 340. The mouth 334 may have a first radius 422 and a second radius 424 that extend radially from and below the central axis 306 on the pin 324. The first radius 422 is larger than the second radius 424, with a plurality of radii distances between the central axis 306 and a first surface 426. The decrease in length between the first and second radii 422, 424 may cause the first surface 426 to form the mouth 334 into the shape of a partial funnel below the cut 412. The partial funnel shape may help guide fluid through the mouth and into the first bore 340.

The cut 412 has a second surface 428 and a third surface 430. The second surface 428 that may be lateral and coplanar with a plane perpendicular to the central axis 306. The third surface 430 may be axial and coplanar with a plane parallel to the central axis 306. The second surface 428 may abut the seal 338 from the side and the third surface 430 may abut the bottom of the ring 336 and seal 338.

The first bore 340 may have a surface 432 and the second bore 342 may have a surface 434 that surround central axis 306. The surfaces 432, 434 may be smooth allowing lubricant or other fluid to travel with minimal resistance.

The first holes 350 may each have an outlet 452 and a third diameter 454. As the first holes 350 transitions into the outlet 452, the diameter of the outlets 452 gradually expands along axes 353 from distance of the third diameter 454 to the distance of a fourth diameter 456. Between the third diameter 454 and fourth diameter 456 is a fourth surface 458. A fourth surface 458 may be radial to and circumferentially surround each of the axes 353. The expansion of the diameter of the outlet 452 between the third and fourth diameter 454, 456 creates a funnel like shape for the fourth surface 458 and outlet 452. The shape of the fourth surface 458 and outlet 452 may help distribute lubricant over a wider area, such as on bearing 322. The increase in area for lubricant distribution may allow for an increase in heat transfer from the inner surface 354 of the bearing 322 to the lubricant. The funnel like shape of the fourth surface 458 and outlet 452 may also allow for lubricant from gears above the pin 324 to enter the second bore 342.

Thus, disclosed herein are systems and components for a relates generally to a pin of a gear designed to receive and direct lubricant. The pin may support and direct lubricant to a gear and a bearing supporting a gear shaft. The pin having two bores of different diameters forming a step. The step may form a sump for lubricant to accumulate. The step and sump may prevent or reduce a quantity of lubricant from flowing out of the pin through the mouth of the pin. The sump and positioning of holes in the pin also promote lubricant to leave the pin in the direction of gravity. The pin may therein be used to direct lubricant consistently without centripetal force. The pin may improve lubrication and heat dissipation during operations with a fixed or stationary planet carrier by providing lubricant consistently to planet gears.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A planetary transmission system comprising:
a planet gear;
an outer bearing;
a ring;
a seal, wherein the planet gear and the outer bearing are positioned within a planetary transmission relative to the seal; and
a planetary gear pin including an inner bore fluidly coupled to an outer bore, wherein the outer bore is narrower in diameter than the inner bore and a difference in diameter therebetween allows oil flow by gravity from the outer bore to the inner bore and reduces oil flow from the inner bore to the outer bore, wherein oil exits the inner bore via a plurality of holes fluidly coupling the inner bore to the outer bearing without valves, wherein the planetary gear pin includes a cut that partially intersects the outer bore, and wherein the ring and the seal are inserted partially into the cut.

2. The planetary transmission system of claim 1, wherein one bore of the outer bore and the inner bore is fluidly coupled to the plurality of holes, the plurality of holes extending radially from the one bore, and wherein the plurality of holes are of a number and an angle from one another so one or more holes is at a lowest point of the planetary gear pin allowing lubricant to flow out.

3. The planetary transmission system of claim 2, wherein the planetary transmission system is configured so that lubricant flows through and around the outer bearing and to the planet gear.

4. The planetary transmission system of claim 3, wherein the difference in diameter forms a step.

5. The planetary transmission system of claim 4, wherein the step is configured to prevent lubricant from flowing back through the planetary gear pin.

6. The planetary transmission system of claim 5, wherein the step is shaped to form a sump of lubricant that accumulates and drains through the plurality of holes by gravity.

7. The planetary transmission system of claim 1, wherein the cut only partially intersects the outer bore and does not intersect the inner bore.

8. The planetary transmission system of claim 7, wherein an end of the planetary gear pin opposite the inner bore is solid without any lubricant exit point.

9. The planetary transmission system of claim 8, wherein the plurality of holes are an only direct connection between an external surface of the planetary gear pin and the inner bore.

10. The planetary transmission system of claim 1, wherein the inner bore is fluidly coupled directly to the plurality of holes, the plurality of holes extending radially from the inner bore.

11. The planetary transmission system of claim 1, wherein:

the planetary transmission system is configured so that lubricant flows through and around the outer bearing and to the planet gear;

the difference in diameter forms a step;

the step is configured to prevent lubricant from flowing back through the planetary gear pin;

the step is shaped to form a sump of lubricant that accumulates and drains through the holes by gravity;

an opposite end of the planetary gear pin opposite the inner bore is solid without any lubricant exit point; and the holes are an only direct connection between an external surface of the planetary gear pin and the inner bore.

12. The planetary transmission system of claim 1, wherein the plurality of holes are circular.

13. The planetary transmission system of claim 1, wherein the planetary gear pin is cylindrical.

* * * * *